Patented Jan. 7, 1947

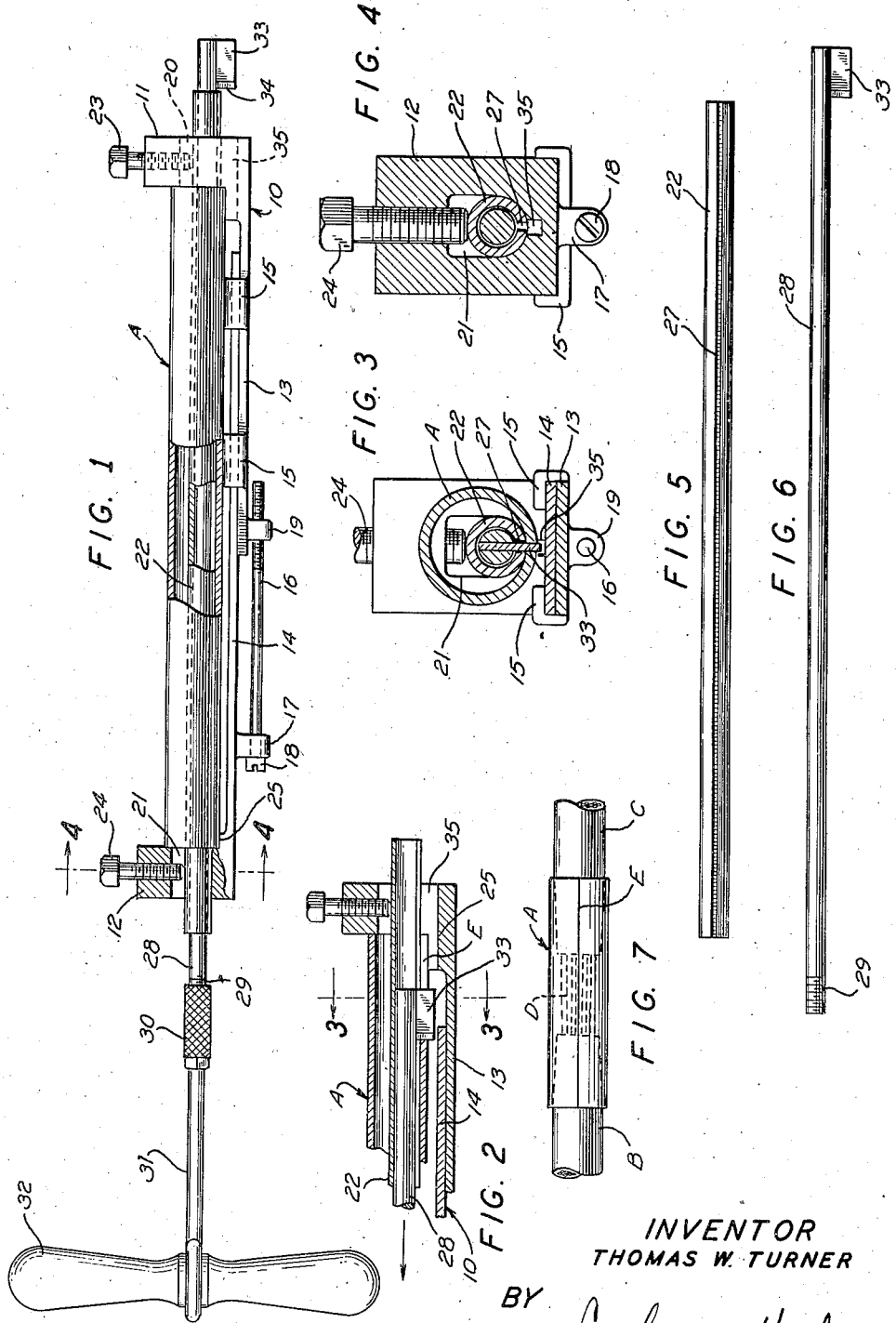

2,414,073

UNITED STATES PATENT OFFICE 2,414,073

SLEEVE SPLITTING DEVICE FOR CABLE SPLICING

Thomas W. Turner, Brookings, S. Dak.

Application March 31, 1945, Serial No. 585,931

8 Claims. (Cl. 30—91)

This invention provides a device for splitting the lead sleeves used to cover the splices made in telephone cables and other multi-wire cables.

The usual cable has a lead sheath for protection against damage and in making splices in such cables it is necessary to remove a considerable portion of the sheath at the point where the splice is to be made. It is customary then, after all of the wires have been connected, to cover the splice with a lead sleeve which is of a length sufficient to completely span the splice and the adjacent ends of the cable sheath. In the application of this sleeve to the splice it is, of course, necessary to split the sleeve so that it may be opened and slipped over the cable and then drawn tight therearound.

It has been the general practice heretofore to split the sleeve by a hack saw and this is a time and labor consuming task, particularly for the reason that the ordinary sleeve is in the neighborhood of 14 inches in length. It is accordingly the primary object of my present invention to provide a simple form of device into which the sleeve may be readily inserted, and when once properly located, may be split from end to end in one operation. The use of my device thus effects a considerable saving of time and work.

Another object is to provide a sleeve splitting device of this nature which is fully adjustable and applicable to sleeves of any length or diameter ordinarily encountered in this work.

These and other more detailed and specific objects will be disclosed in the course of the following specification, reference being had to the accompanying drawing, in which—

Fig. 1 is a side elevation partially in section and showing my sleeve splitting device with the sleeve inserted therein and the parts ready for the operation of splitting the sleeve.

Fig. 2 is a longitudinal sectional view through the right hand end portion of the device as it is viewed in Fig. 1 and showing the splitting operation in progress.

Fig. 3 is an enlarged sectional view along the line 3—3 in Fig. 2.

Fig. 4 is a similar enlarged sectional view, but along the line 4—4 in Fig. 1.

Fig. 5 is an elevational view of the guide tube forming a part of my invention.

Fig. 6 is a similar view of the cutting rod.

Fig. 7 is an elevational view of a splice in the cable showing the split sleeve over the splice.

Referring now more particularly and by reference characters to the drawing, A designates generally a cable sleeve of conventional form. This sleeve is made of lead and may be of any diameter and length required for the work. As the sleeve reaches the workman or lineman it requires splitting in order to fit the ends B and C of the cable, as seen in Fig. 7, and for application to these cable ends to cover the spliced wires D the sleeve A is split or slit from end to end lengthwise, as indicated at E throughout the drawing. When thus split the sleeve may be readily opened out so as to slide sidewise over the splice and the adjacent ends of the cable sheath after which it may be readily rolled back together to bring the split margins into meeting relation, as it is shown in Fig. 7.

My improved sleeve splitting device comprises a frame designated generally at 10 which is adjustable lengthwise and is provided at opposite ends with clamping heads 11 and 12 between which the sleeve A may be positioned and held against endwise displacement. The heads 11 and 12 have arms 13 and 14 extending parallel with the sleeve A and arranged in overlapping relation, as clearly shown in Fig. 1, so that by endwise movement of the arms relative to each other the distance between the clamping heads 11 and 12 may be readily adjusted. To hold the arms in assembled relation, arm 13 is provided with ears or lugs 15 turned inwardly and sliding in overlapping engagement with the other arm 14, and to positively adjust the arms lengthwise I provide an adjusting screw 16. This screw 16 is passed through an apertured lug 17 on the arm 14 with its head 18 positioned against said lug, and the screw is then threaded through a tapped lug 19 upon the arm 13. Obviously the turning of the screw 18 will adjust the distance between the lugs 17 and 19 in such manner as to spread the clamping heads 11 or 12 apart, or draw them together, and when the cable sleeve A is placed therebetween the screw 18 may be turned up to cause the heads to grip its ends.

The clamping heads 11 and 12 have openings 20 and 21, respectively, smaller in size than the cable sleeve A and through these openings there may be removably positioned a guide tube, designated at 22. Said guide tube is clamped in place by means of set screws 23 and 24 tapped into the clamping heads 11 and 12 and adapted to bear upon the end portions of the tube, forcing them against one side or the bottoms of openings 20 and 21. The length of the guide tube 22 is such that it will project beyond the clamping heads 11 and 12 at each end and when secured in place by the set screws the guide tube bears against one side of the cable sleeve A preventing its movement sidewise from the frame and particularly in a direction away from the side thereof at which the arms 13 and 14 are located. If desired, supporting shoulders or steps 25 may be provided at the junctions of the clamping heads with the arms 13 and 14 upon which the ends of the cable sleeve A may rest when held thereagainst by the guide tube 22, as seen in Fig. 1. The sleeve is thus held in slightly spaced relation with respect to the arms 13 and 14.

The guide tube 22 is provided with a longitudinal extending guide slot 27 from end to end and when properly positioned this slotted side of the tube is next to the wall of the sleeve A, as seen in Fig. 1. Removably mounted through the guide tube 22 is a cutting rod 28 of greater length than the tube and at one end this rod 28 is threaded, as indicated at 29, to fit a knurled coupling sleeve 30 which is rigidly attached to a pull rod 31. Pull rod 31 is provided with a handle 32 at the end opposite the sleeve 30, by which the cutting rod 28 may be pulled through the guide tube 22, as will be clearly apparent. The end of the cutting rod 28 opposite to that attached to the pull rod and handle is provided with a cutting blade or cutter 33 which is set rigidly into the rod and projects radially therefrom. The blade 33 is sharp on one end, as indicated at 34, and the thickness of the blade is such that it may enter and pass through the slot 27 in the guide tube 22 when the handle 32 is pulled to the left, as the device is viewed in Fig. 1. The blade 33 projects from the cutting rod 28 a distance sufficient to extend some distance beyond the outer peripheral surface of the guide tube 22 and to provide clearance for the plate in its passage the clamping heads 11 and 12 are notched, as indicated at 35.

In operation the pull rod 31 is removed by unscrewing the sleeve 30 and the set screws 23 and 24 are then loosened so that the guide tube 22 and the enclosed cutting rod 28 may be pulled out lengthwise to the right, as viewed in Fig. 1, and removed entirely from the frame 10, thus leaving the space between the clamping heads 11 and 12 clear for the insertion therebetween of the cable sleeve A which is to be split. The clamping heads 11 and 12 are then drawn together, as much as necessary to grip the ends of the sleeve A, by the manipulation of the adjusting screw 16, as aforesaid, and the guide tube 22 and cutting rod 28 are then replaced by inserting them lengthwise through the interior of the sleeve. The set screws 23 and 24 are then turned up again to anchor the guide tube 22 and with the cutter end of the cutting rod 28 pulled out to the right, the pull rod 31 is again connected thereto by replacing the sleeve 30. It will now be evident that with the blade 33 properly aligned with the slot 27 in the guide tube 22 a pull exerted toward the left in Fig. 1 upon the handle 32, while the frame A is held or pulled in the opposite direction, will cause the cutter 33 to be pulled lengthwise the full length of the cable sleeve A. In this process the sharpened end 34 of the blade 33 is caused to engage and split the soft lead wall of the sleeve A its full length, as indicated in Fig. 2, particularly. Due to the softness of the material used in the sleeve A this operation may be carried out without great effort and in one continuous motion, and certainly with far less time and labor than sawing the sleeve to provide the necessary split. When the splitting operation is completed the cutting rod 28 is again returned to starting position and the pull rod 31 removed after which the set screws 23 and 24 are loosened to prevent the disassembly of the split sleeve A which is now ready for application to the cable splice. The removal of the previously split sleeve of course at the same time prepares the device for application to a new sleeve and the operations may be continued so long as necessary to turn out the required number of properly and evenly split sleeves.

It is understood that suitable modifications may be made in the construction and details of the device as thus described, without departing from the spirit and scope of the appended claims. Having now therefore fully disclosed my invention, what I claim to be new and desire to protect by Letters Patent is:

1. A device of the character described and for longitudinally splitting a cable sleeve, comprising means for holding the sleeve with clamping engagement with the ends thereof while permitting access to the interior of the sleeve, a member adapted to be inserted through the sleeve and movable lengthwise therethrough, and a cutter on said member adapted to split the sleeve as said member is moved lengthwise therethrough.

2. A device for longitudinally splitting a cable sleeve, comprising means for holding the sleeve and engaging the same at its ends while permitting access into said ends, a guide member adapted to be inserted into the sleeve and secured in fixed relation thereto, a member movable through said guide member lengthwise with respect to the sleeve, and a cutter on said last mentioned member adapted to operate in splitting engagement with said sleeve as it is moved lengthwise thereof.

3. A device of the character described for splitting a cable sleeve lengthwise, comprising a sleeve holding means having spaced clamping members for engaging the ends of the sleeve, means for adjusting the distance between said clamping members and for drawing them into engagement with the ends of the sleeve, a cutting member supported by said clamping members and movable lengthwise with respect to and within the sleeve, and a cutter on said cutting member adapted to engage and split the sleeve from end to end as it is moved lengthwise thereof.

4. A device of the character described for splitting a cable sleeve lengthwise, comprising a sleeve holding frame having spaced clamping heads adapted to engage the ends of the sleeve, slidably connected arms extending from the clamping heads, means for adjusting said arms lengthwise with respect to each other to adjust the spacing between the clamping heads and to force the same towards each other against the ends of the sleeve, and a cutting member supported for movement lengthwise with respect to the sleeve to split the same from end to end.

5. A device of the character described for splitting a cable sleeve lengthwise, comprising a sleeve holding device having spaced clamping heads adapted to engage the ends of the sleeve, slidably connected arms extending from the clamping heads, an adjusting screw connecting the arms and operative to relatively adjust the arms to pull the clamping heads into pressure engagement with the ends of the sleeve, and a cutting means movable lengthwise along the sleeve to split the same from end to end.

6. In a device of the character described for splitting a cable splicing sleeve lengthwise, a sleeve holding means having clamp members for engaging the sleeve ends and said members having openings allowing access endwise into the interior of the clamped sleeve, a guide tube removably mounted in said openings and having a longitudinally extending guide slot, a cutting rod slidably mounted in said tube, and a cutting blade extending from said rod and adapted to be guided by said slot in lengthwise cutting engagement with the sleeve.

7. In a device of the character described for splitting a cable splicing sleeve lengthwise, a sleeve holding means having clamp members for engaging the sleeve ends and said members having openings allowing access endwise into the interior of the clamped sleeve, a guide tube removably mounted in said openings and having a longitudinally extending guide slot, a cutting rod slidably mounted in said tube, and a cutting blade projecting radially from the rod and adapted to travel through said slot while projecting therefrom in splitting relation to the sleeve.

8. A device for splitting a cable sleeve lengthwise, comprising in combination, means for holding the sleeve, a guide tube adapted to be inserted into and through the sleeve and having a longitudinally extending slot, a rod slidably mounted in said tube and adapted to be pulled lengthwise therethrough, and a cutting blade on the rod adapted to travel in said slot and be guided thereby in splitting engagement with one side of the sleeve.

THOMAS W. TURNER.